(12) United States Patent
Miller, Jr. et al.

(10) Patent No.: US 6,446,074 B1
(45) Date of Patent: Sep. 3, 2002

(54) SYSTEM AND METHOD FOR DEFINING, BUILDING, AND MAINTAINING DATABASE FILES

(75) Inventors: Donald W. Miller, Jr., Fairview; Michael E. Hellemn, Plano, both of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/528,545

(22) Filed: Mar. 20, 2000

Related U.S. Application Data

(60) Provisional application No. 60/173,176, filed on Dec. 27, 1999.

(51) Int. Cl.[7] .............................................. G06F 17/30
(52) U.S. Cl. ......................................... 707/101; 707/10
(58) Field of Search ............................. 707/101, 3, 10, 707/100, 201, 203; 370/254; 703/22

(56) References Cited

U.S. PATENT DOCUMENTS 6,055,538 A * 4/2000 Kessenich et al. ........... 707/101
6,144,961 A * 11/2000 De La Salle .................. 707/10
6,252,858 B1 * 6/2001 Inoue ........................... 370/254

* cited by examiner

*Primary Examiner*—Diane D. Mizrahi
(74) *Attorney, Agent, or Firm*—Baker Botts, LLP; V. Lawrence Sewell; Craig A. Hoersten

(57) ABSTRACT

A system for defining, building, and maintaining database files includes a database builder, a user interface, and a memory. The database builder provides screen displays to the user interface to allow access to databases within the memory. The database builder provides a capability to manage binary files of databases in the memory.

16 Claims, 5 Drawing Sheets

SYSTEM AND METHOD FOR DEFINING, BUILDING, AND MAINTAINING DATABASE FILES

RELATED APPLICATION

This application claims the benefit of U.S. Provisional Application No. 60/173,176 Filed Dec. 27, 1999.

TECHNICAL FIELD OF THE INVENTION

The present invention relates in general to computer system management and more particularly to a system and method for defining, building, and maintaining database files.

BACKGROUND OF THE INVENTION

Many applications, especially in telecommunications environment, are driven by extensive database operations. In many instances, complex databases are used to drive telecommunications applications wherein a database may have a field in that points to a field in another database. Moreover, some databases have binary database files which are difficult to maintain by conventional methods. As databases grow in size and complexity, there is an increase in the effort and risk of maintaining these databases. Therefore, it is desirable to provide a technique to maintain complex databases in a telecommunications environment.

SUMMARY OF THE INVENTION

From the foregoing, it may be appreciated by those skilled in the art that a need has arisen for a technique to handle complex databases especially in a telecommunications environment. In accordance with the present invention, a system and method for defining, building, and maintaining database files are provided that substantially eliminate or reduce disadvantages and problems associated with conventional database management techniques.

According to an embodiment of the present invention, there is provided a system for defining, building, and maintaining database files that includes a memory operable to store a plurality of databases. The plurality of databases have a relationship among one another. A database builder has access to the plurality of databases stored in the memory. The database builder is capable of learning the relationships among the plurality of databases. A user interface provides access for a user to the plurality of databases according to the database builder.

The present invention provides various technical advantages over conventional database management techniques. For example, one technical advantage is to provide an easier and safer method for maintaining complex databases. Another technical advantage is to provide a technique to maintain binary database files. Yet another technical advantage is to provide a mechanism to traverse through multiple databases. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
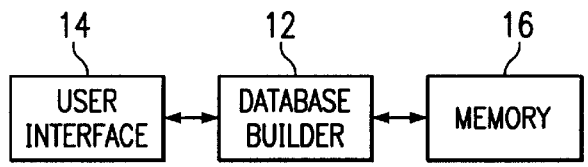
FIG. 1 illustrates a block diagram of a system for managing databases.

FIG. 1 is a block diagram of a system 10 for managing databases in a telecommunications network. System 10 includes a database builder 12, a user interface 14, and a memory 16. Database builder 12 provides an ability to define, build, and maintain database files in memory 16 through user interface 14. User interface 14 provides a graphical user interface to allow a user to view any record of a database by specifying a database structure, a database file name, and a desired record number.

Database builder 12 maintains complex databases required for such telecommunications applications as flexible account message and accounting (AMA) systems as well as other database driven applications. Databases for such applications have fields in one database that point to fields in another database. An index is used to find a field in the next database and a pointer is set to the correct field while the application is running. The databases may have data that is set by the user and data set by the application. Database builder 12 learns and remembers relationships between pre-set and real-time fields to permit the user to traverse through the databases. Through database builder 12, the user may move forward from database to database and step backwards through the databases.

Database builder 12 learns the structures of the databases directly from C header files. These structures are used as a template to read binary files in the databases. Database builder 12 allows data in the binary files to be viewed and edited. The user can insert and delete records from a database and insert and delete fields from the database structure itself. The binary files can be automatically reformatted to the new structure.

Figure 2A:
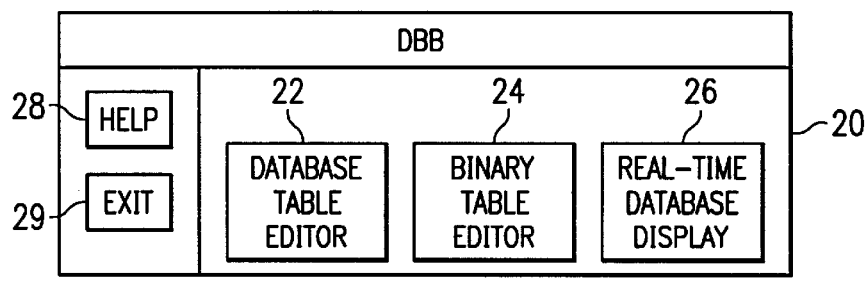
FIGS. 2A–D illustrate screen displays used to manage databases.

FIGS. 2A–D show the screen displays generated by database builder 12 for user interface 14 to allow the user to traverse through databases in memory 16. FIG. 2A shows a launcher display 20 generated by database builder 12. Launcher display 20 includes access to a database table editor 22, a binary table editor 24, and a real-time database display 26. Database table editor 22 is used to create database table definitions. Binary table editor 24 is used to create binary tables. Real-time database display 26 allows the user to view active memory. Launcher display 20 also includes a help option 28 to provide a user with basic information with respect to operation of database builder 12. An exit option 29 allows the user to exit from database builder 12.

Figure 2B:
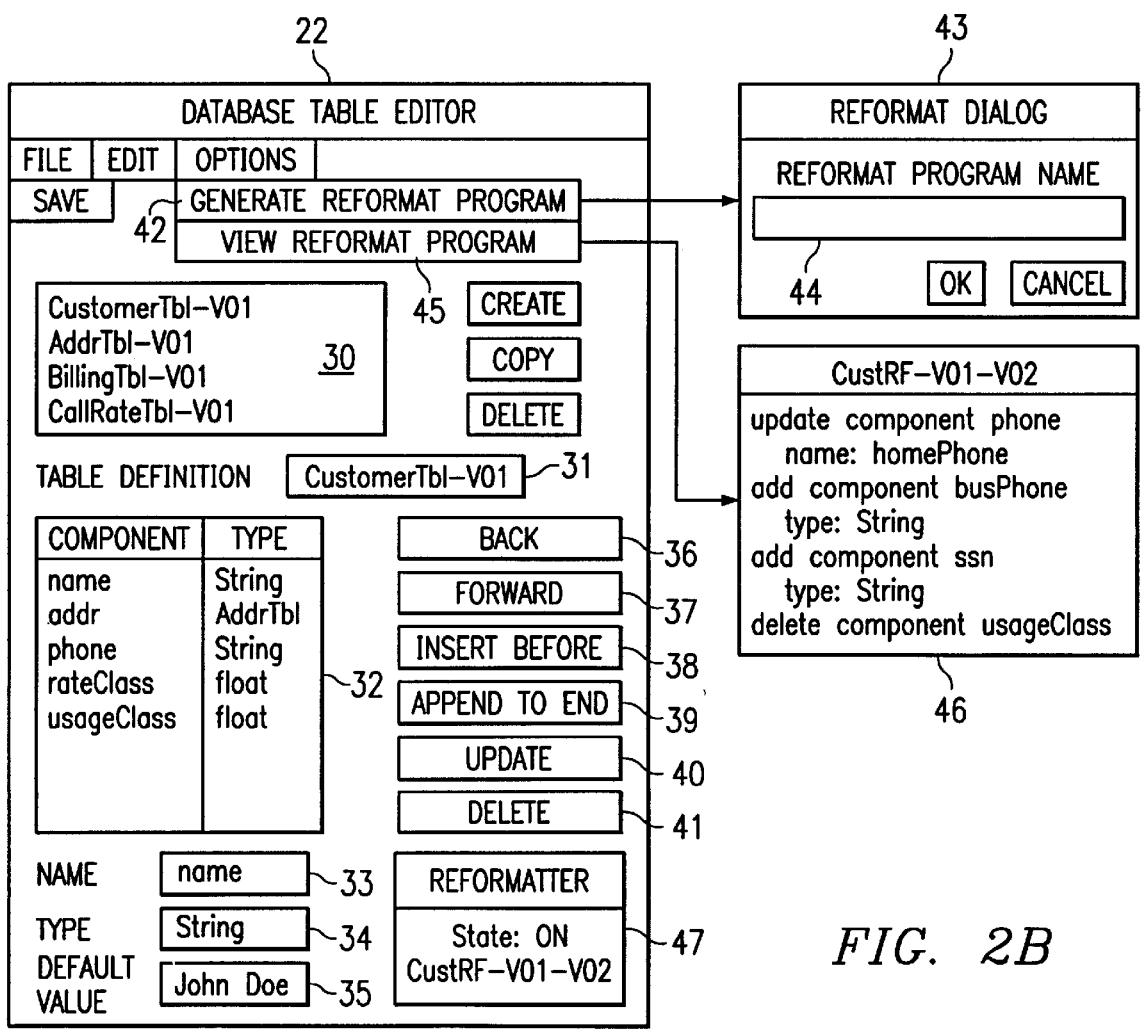

FIG. 2B shows the screen display for database table editor 22. Database table editor 22 is accessed through launcher display 20. Database table editor 22 includes a table list 30 and a component list 32. Table list 30 displays a list of tables known to database builder 12. Component list 32 displays a list of all components and their types associated with a table identified in a table definition field 31. Components and types may be edited using a name field 33, a type field 34, and a default value field 35. Components may be tables themselves. A back option 36 and a forward option 37 allow a user to scroll through component list 32 and navigate in nested tables. New components may be placed into components list 32 using an insert before option 38 and an append to end option 39. Changes to components may be initiated through an update option 40 and components may be eliminated through a delete option 41.

Database table editor 22 provides a reformatter option 42 to generate a reformatter program. If the user has made changes to an existing table definition and wants to convert existing tables to the new format, the reformatter program can be used without performing any manual editing. A reformat dialog 43 allows for input of a reformat program name 44. The reformatter program is initiated upon entering the reformat program name 44. Contents of the reformatter program may be viewed through a view option 45 that displays a reformatter list 46. A reformatter box 47 provides a state of a specified reformatter program.

Figure 2C:
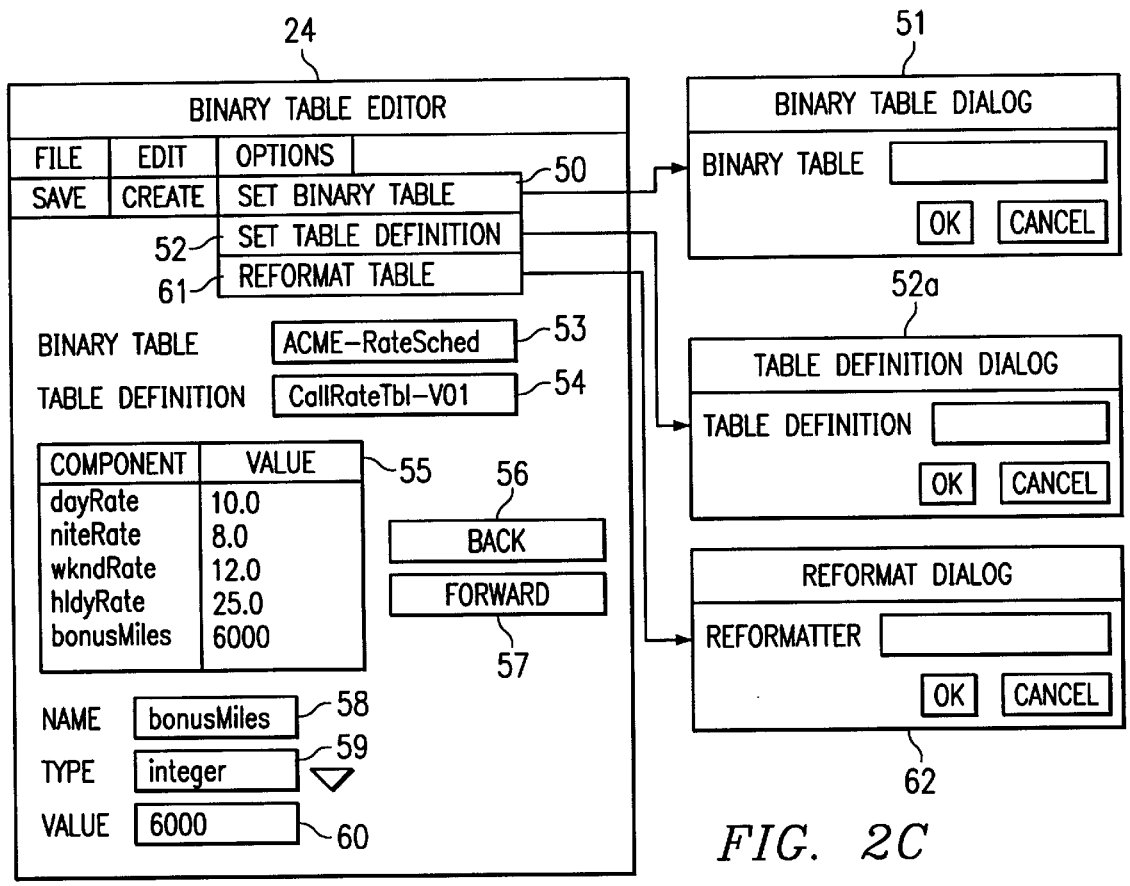

FIG. 2C shows binary table editor 24. Binary table editor 24 is accessed through launcher display 20. Binary table editor 24 allows the user to create binary tables which are installed at customer sites and used by application programs. A set binary table option 50 displays a binary table dialog 51 that allows for entry of a desired binary table. A set table definition option 52 displays a table definition dialog 52a that allows for entry of a desired table definition. A binary table field 53 displays the desired binary table. A table definition field 54 displays the desired table definition. A binary table list 55 displays the components of the selected binary table and table definition. Binary table list 55 may be scrolled through using a back option 56 and a forward option 57. Changes to components may be made through a name field 58, a type field 59, and a value field 60. Binary table editor 24 also includes a reformat table option 61 that displays a reformat dialog 62. Through reformat table option 61, the user may upgrade a binary table to a new format. The user may enter the name of the reformatter program generated from database table editor 22.

Figure 2D:
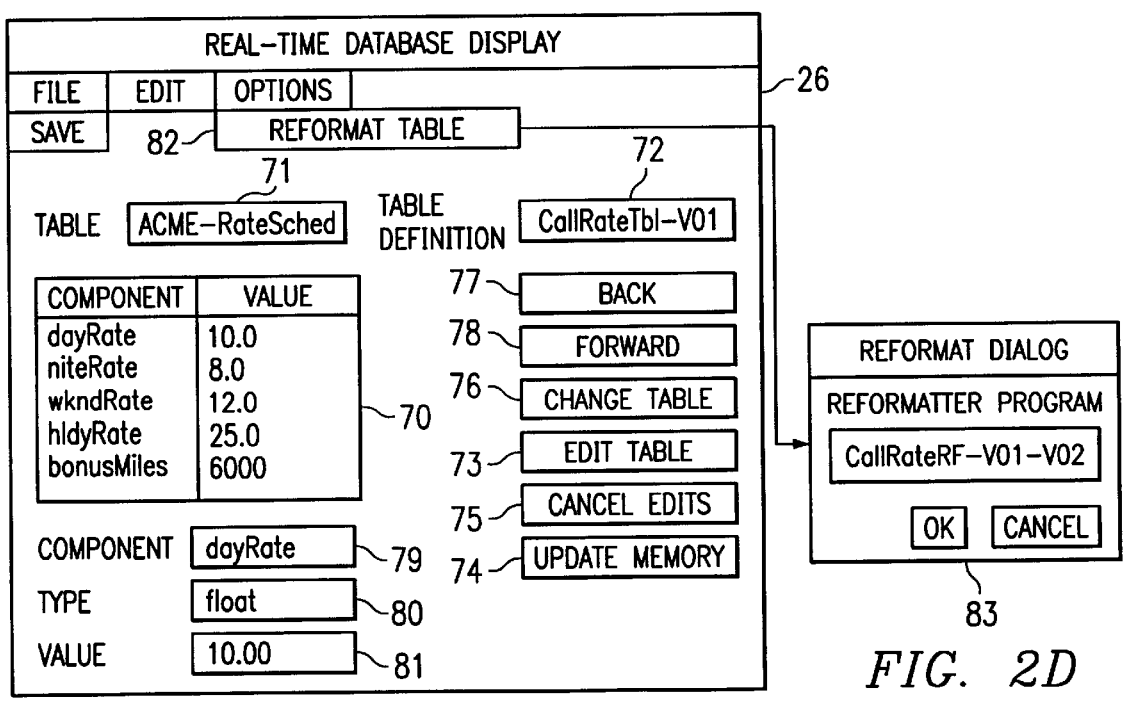

FIG. 2D shows a real-time database display 26. Real-time database display 26 is accessed through launcher display 20. Real-time database display 26 allows the user to view a binary table in active memory according to a table definition created at database table editor 22. Real-time display 26 includes a binary list 70 that displays the binary table and table definition specified in a binary table field 71 and a table definition field 72. The binary table shown in binary list 70 may be edited through an edit table option 73. Edits made to the binary table may be entered through an update memory option 74 or canceled through a cancel edits option 75. The binary table shown in binary list 70 may be changed to a different binary table through a change table option 76. Navigating through binary list 70 is performed through a back option 77 and a forward option 78. Details of a particular component of binary list 70 may be shown in a component field 79, a type field 80, and a value field 81. A reformat table option 82 allows for the running of a reformatter program through a reformat dialog 83.

Figure 3A:
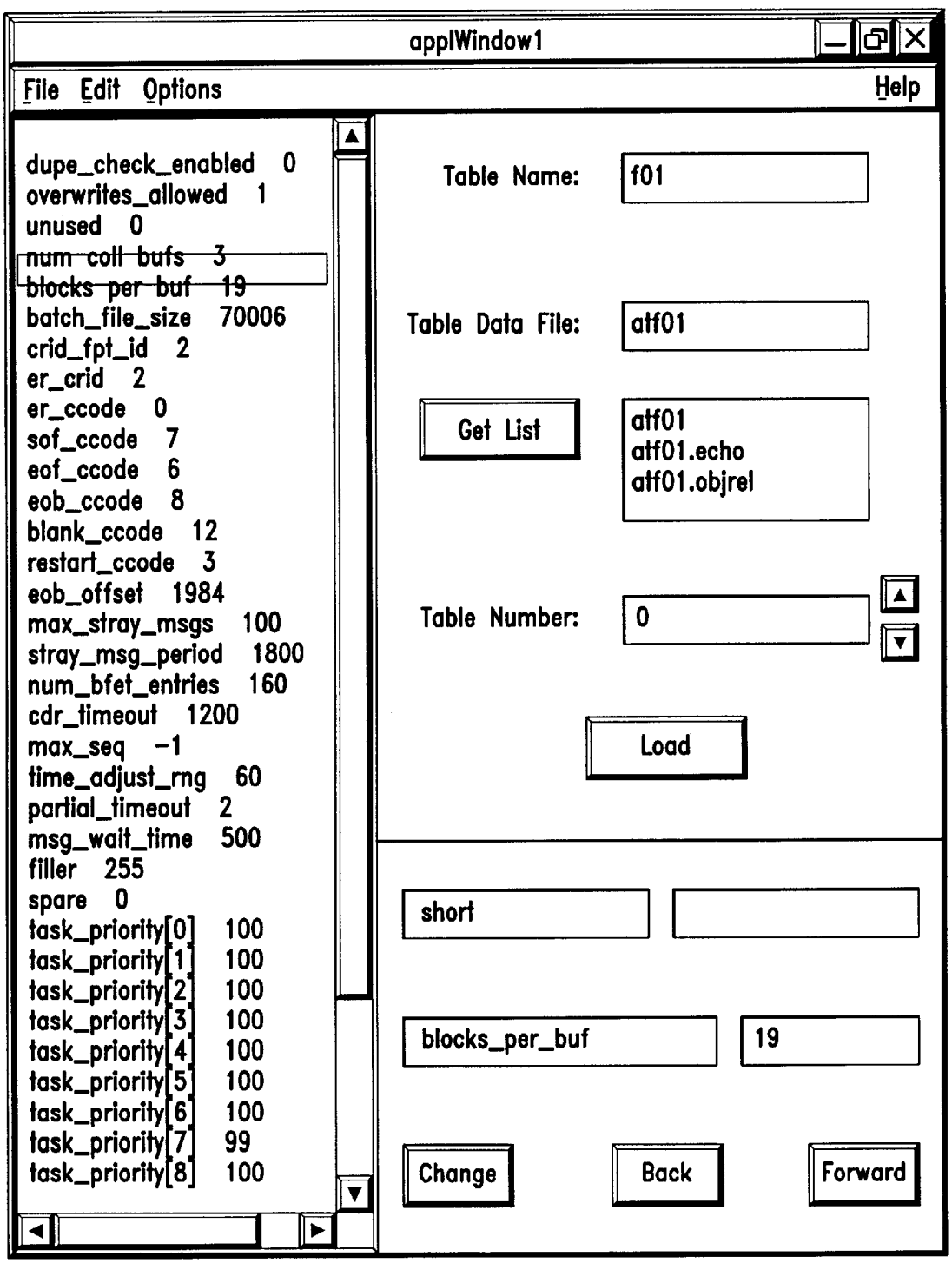
FIGS. 3A–C illustrate a functionality of a database builder in the system.
Figure 3B:
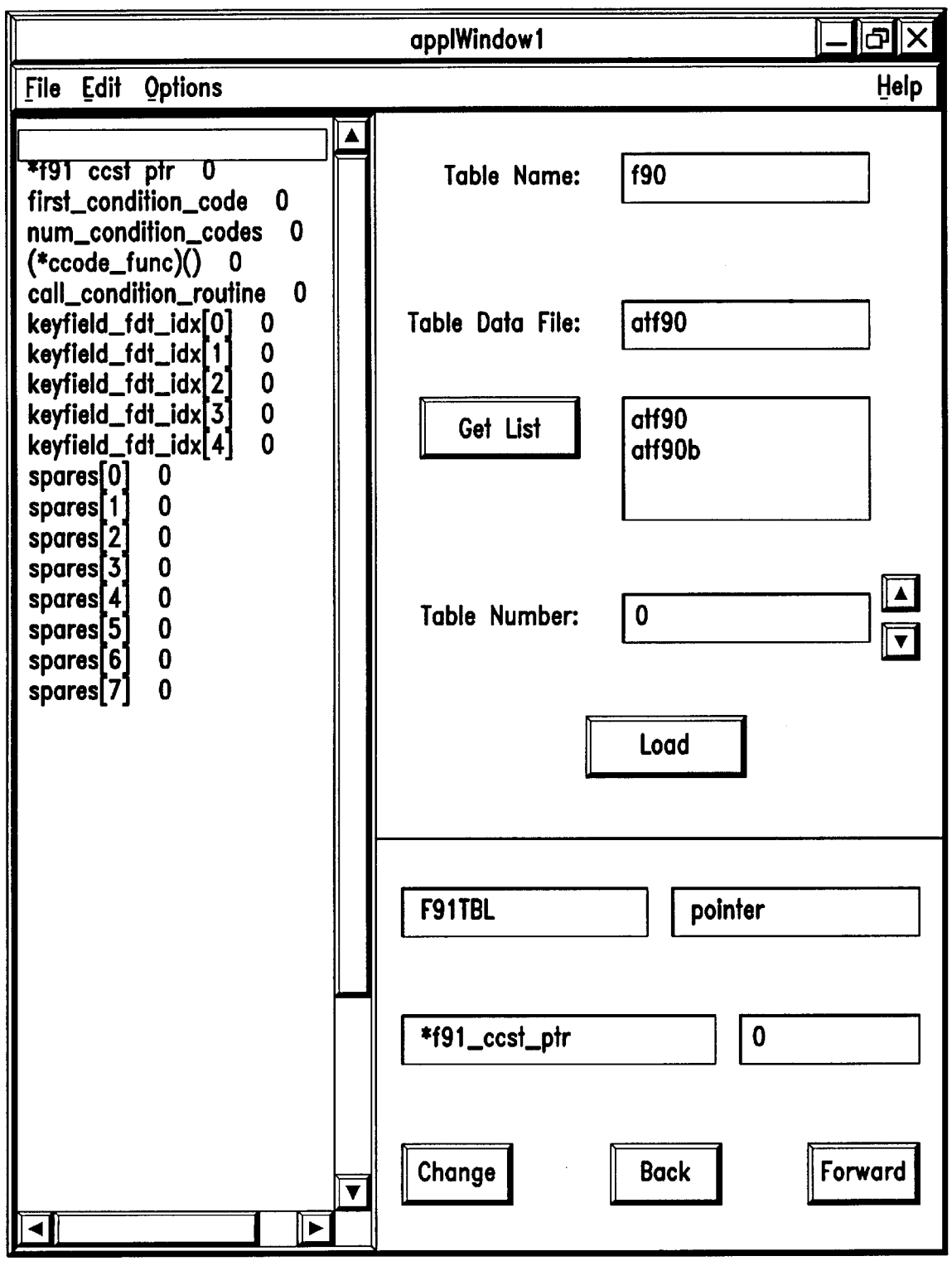
Figure 3C:
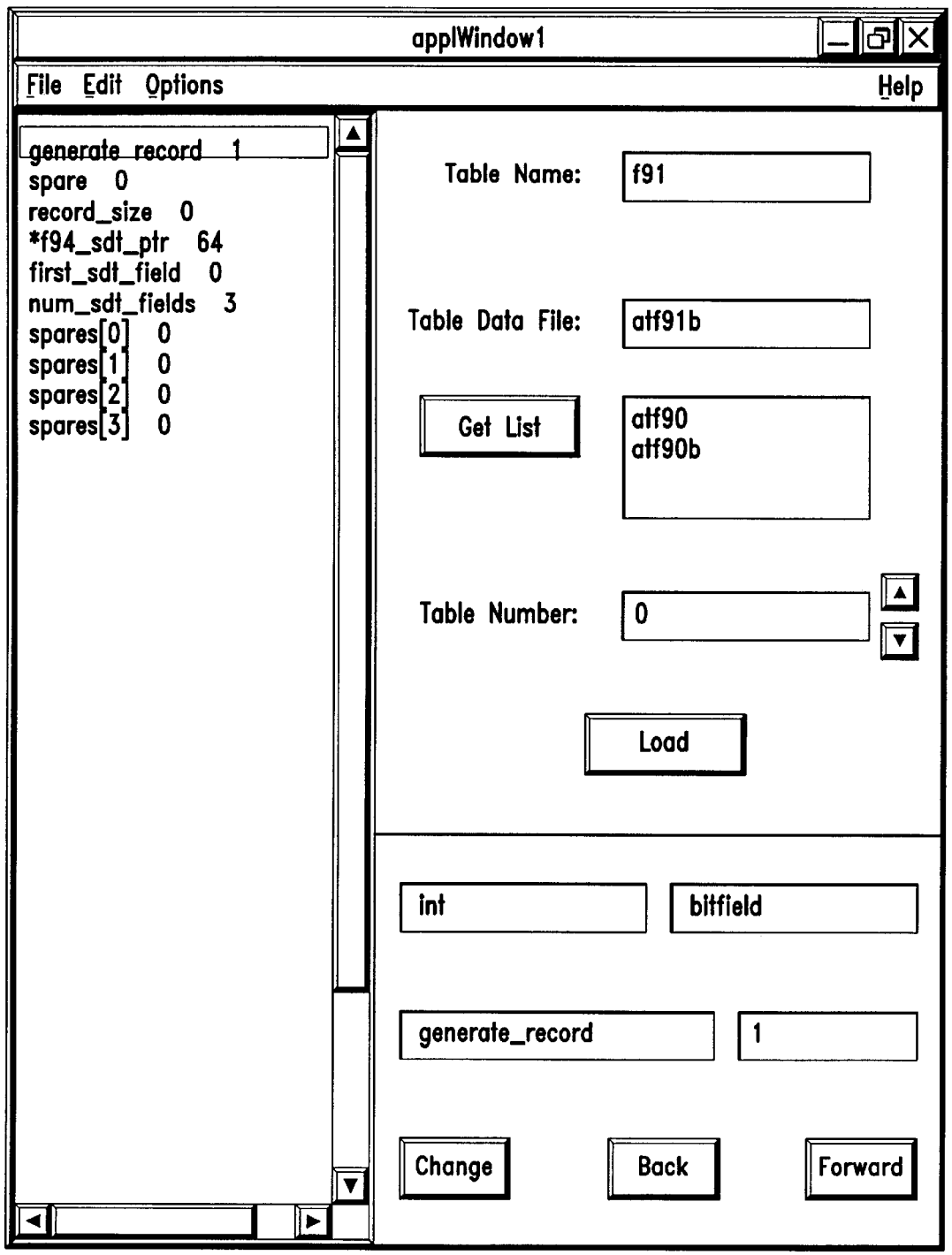

FIGS. 3A–C show an exemplary functionality of database builder 12. FIG. 3A shows an example display of a record from a database. In this example, the user has selected the record specified as Table f01, Table Data File atf01, and Table Number 0. The database structure is specified as f01 which is read directly from the C header files. The data is stored in binary form in the file atf01. The Table Number specifies that this is the first data record in atf01. The data is listed with the field name and the value. The lower right portion of the example display has information about the type of the selected field blocks_per_buf. The value is currently 19. The user can change the value by entering a new value in the field and selecting the change button.

FIG. 3B shows the ability of database builder 12 to learn to traverse a database. In this example display, the selected field f91_ccst_ptr is a pointer to a database table of type F91TBL in another database. The Forward button will take the user to the new database table shown in FIG. 3C. The pointer is not set until the application is executing. The first time the user attempts to navigate to the new database table, the user will be prompted for the name of the field that specifies the index of the new database table. In the example of FIG. 3B, this is the field first_condition_code. Database builder 12 correlates the index field with the pointer field and the user is not prompted for that relationship again. In this manner, database builder 12 learns the relationships between databases. Once learned, the user merely has to navigate using the Forward and Back buttons.

Thus, it is apparent that there has been provided, in accordance with the present invention, a system and method for defining, building, and maintaining database files that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for defining, building, and maintaining database files, comprising:

a memory operable to store a plurality of databases, the plurality of databases having a relationship among one another;

a database builder, the database builder operable to access the plurality of databases stored in the memory, to learn the relationships among the plurality of databases, to identify database structures of the plurality of databases, and further operable to allow the user to insert and delete fields from the database structures;

binary data files of the plurality of databases being automatically reformatted to new database structures created as a result of the insertion and deletion of fields from the data base structures; and a user interface coupled to the database builder, the database builder operable to provided access for a user to the plurality of databases.

2. The system of claim 1, wherein one of the plurality of databases has a field that points to a field in another database.

3. The system of claim 1, wherein the database builder allows the user to traverse through the plurality of databases.

4. The system of claim 1, wherein the database structures are used by the database builder as templates to read binary data files of the plurality of databases.

5. The system of claim 1, wherein the database builder is operable to allow the user to insert and delete records within the plurality of databases.

6. The system of claim 1, wherein the database builder is operable to maintain binary data files of the plurality of databases.

7. The system of claim 1, wherein the database builder is operable to create database table definitions used to create binary tables of the plurality of databases.

8. The system of claim 7, wherein the database builder is operable to display the binary tables in the memory for the user through the user interface.

9. The system of claim 7, wherein the database builder is operable to change values in the binary tables in response to inputs from the user.

10. The system of claim 7, wherein the database builder is operable to change database table definitions in response to inputs from the user.

11. The system of claim 10, wherein the database builder is operable to execute a reformatter program, the reformatter program operable to convert the binary tables in response to changes made to the database table definitions.

12. The system of claim 11, wherein the database builder is operable to display the reformatter program to the user through the user interface.

13. A method for defining, building, and maintaining database files, comprising:

storing a plurality of databases in a memory, the plurality of databases having a relationship among one another;

identifying the relationships among the plurality of databases;

providing access to the plurality of databases in response to the identified relationships;

identifying database structures of the plurality of databases;

altering fields of the database structures; and reformatting the plurality of databases in response to altered database structure.

14. The method of claim 13, further comprising:

creating database table definitions of the database structures;

creating binary tables of the plurality of database table definitions.

15. The method of claim 14, further comprising:

changing a database table definition;

reformatting binary tables in response to changes in a database table definition.

16. The method of claim 15, further comprising:

displaying the reformatting of the binary tables.

* * * * *